Figure 1:
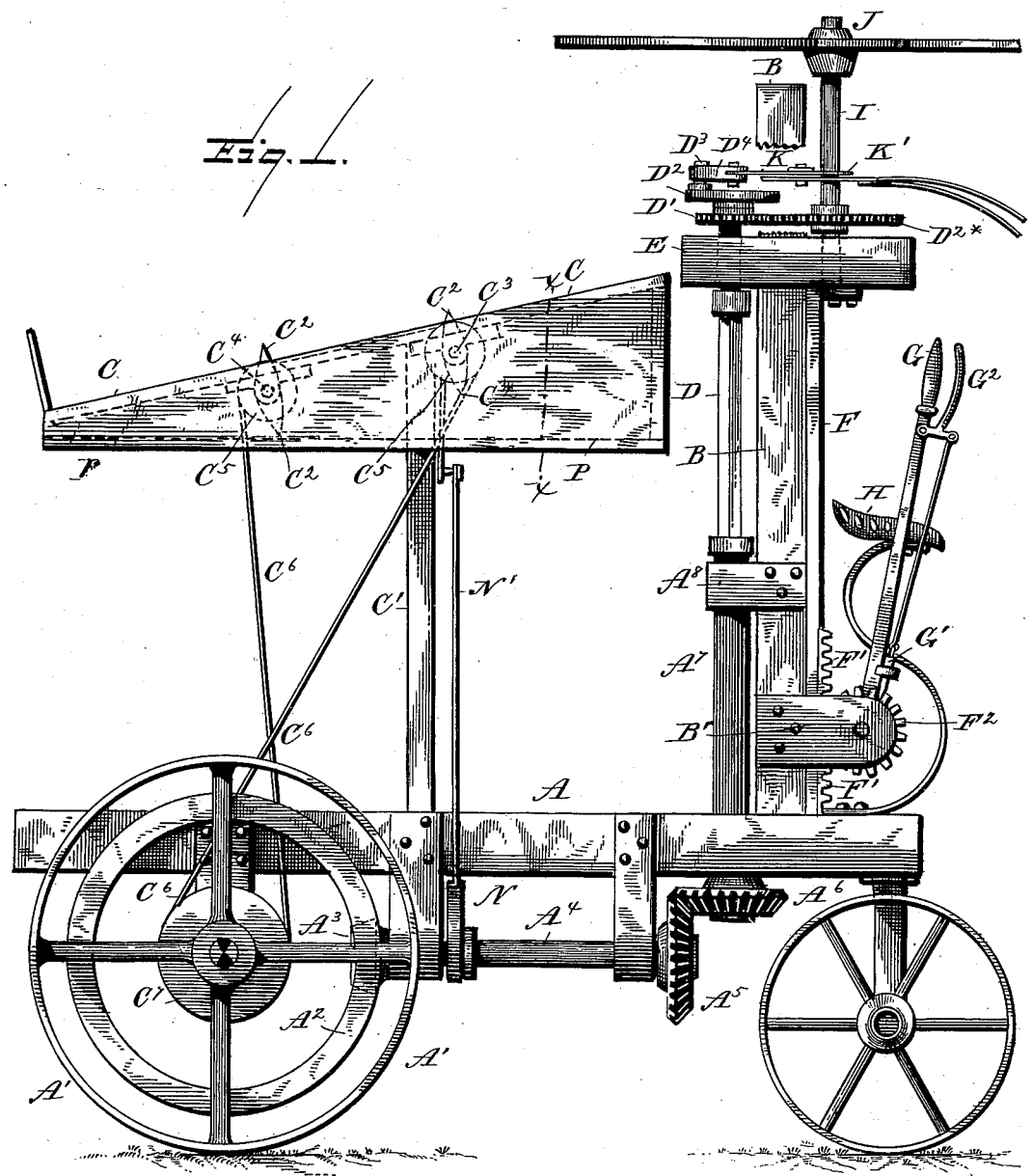

(No Model.) 3 Sheets—Sheet 1.
C. R. HUCKLEBERRY & F. W. REESE.
BROOM CORN HARVESTER.

No. 362,511. Patented May 10, 1887.

Witnesses:
L. C. Hills,
Wm. J. Duvall

Inventors:
C. R. Huckleberry,
F. W. Reese
By their Attorney
E. B. Stocking (No Model.) 3 Sheets—Sheet 2.
C. R. HUCKLEBERRY & F. W. REESE.
BROOM CORN HARVESTER.
No. 362,511. Patented May 10, 1887.
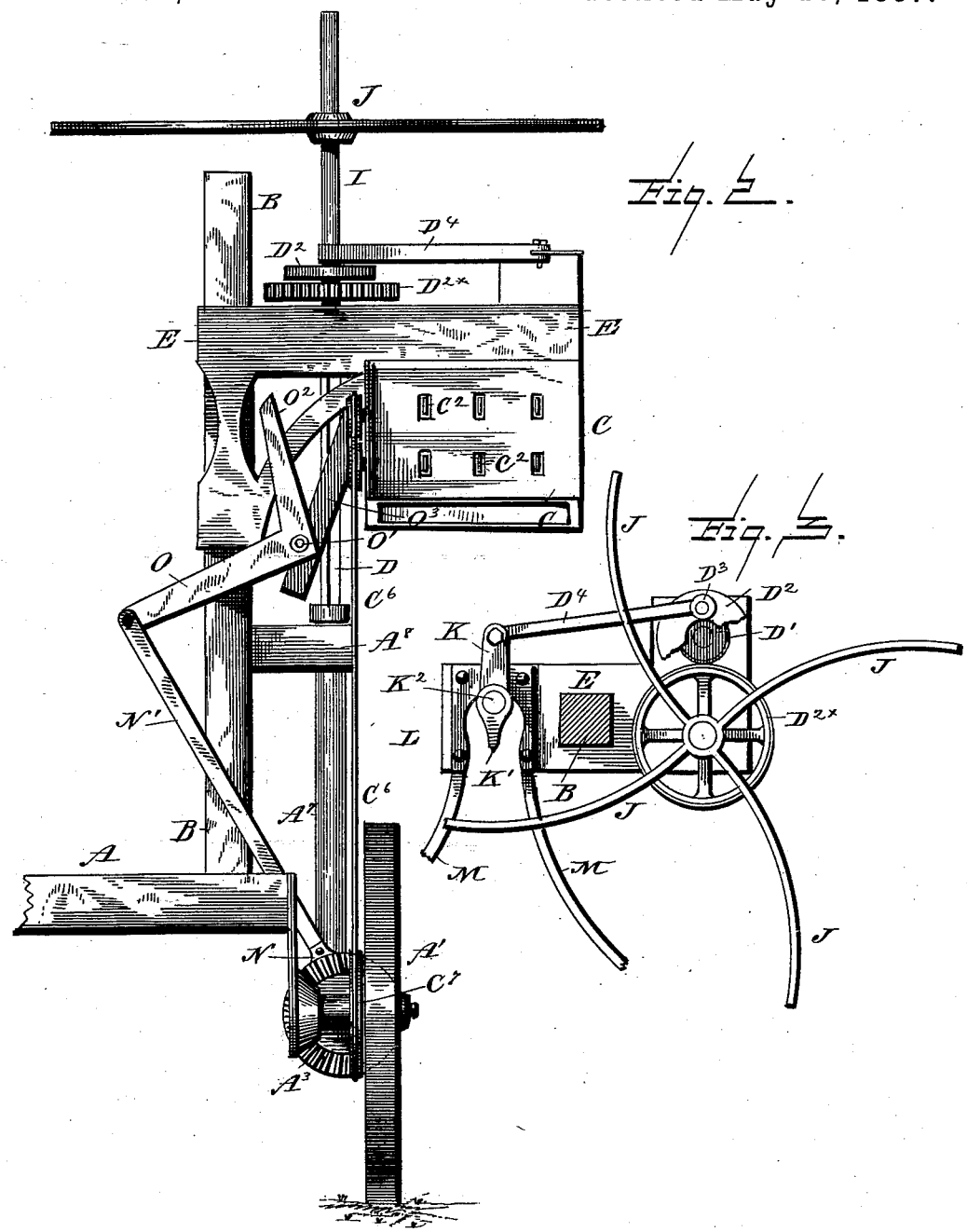

(No Model.) 3 Sheets—Sheet 3.
C. R. HUCKLEBERRY & F. W. REESE.
BROOM CORN HARVESTER.
No. 362,511. Patented May 10, 1887.
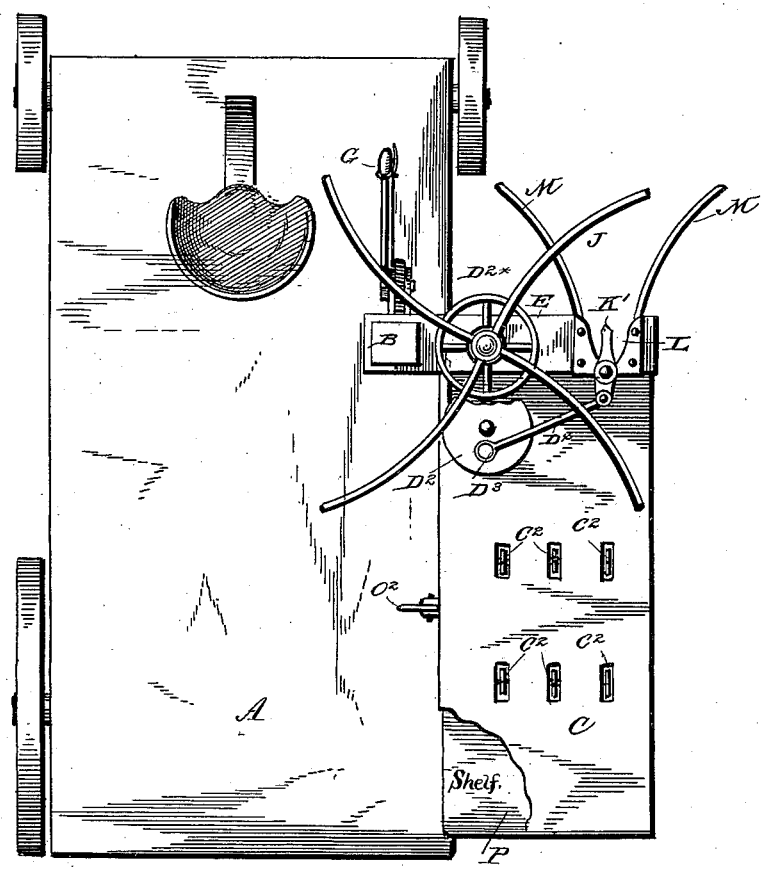

United States Patent Office.

CHARLES R. HUCKLEBERRY AND FREDERICK W. REESE, OF PARIS, ILL.

BROOM-CORN HARVESTER.

SPECIFICATION forming part of Letters Patent No. 362,511, dated May 10, 1887.

Application filed June 7, 1886. Serial No. 204,345. (No model.)

*To all whom it may concern:*

Be it known that we, CHARLES R. HUCKLEBERRY and FREDERICK W. REESE, citizens of the United States, residing at Paris, in the county of Edgar, State of Illinois, have invented certain new and useful Improvements in Machines for Harvesting Broom-Corn, of which the following is a specification, reference being had therein to the accompanying drawings.

This invention relates to a machine for harvesting broom-corn by a method which consists in cutting the tops or heads of the corn from the stalks while standing in the field and in the place of growth.

The general object of the invention is to provide mechanism which shall be adapted to be drawn along the sides of the rows of broom-corn in a broom-corn field, so as to present cutting mechanism over and into the corn and at such a point as to sever from the stalks the brush or heads—that is, that portion which is used in the manufacture of brooms; and the invention consists in certain features of construction, hereinafter described, and particularly pointed out in the claims.

Referring to the drawings, Figure 1 is a side elevation of a broom-corn harvester constructed in accordance with our invention. Fig. 2 is a rear elevation of the cutting and delivering mechanism. Fig. 3 is a plan of the cutting and gathering mechanism, and Fig. 4 is a plan showing the relative position of the parts of the machine.

Like letters indicate like parts in all the figures of the drawings.

A represents a truck, upon which is secured a vertical beam or upright, B, and a delivery-table, C. One of the ground-wheels, A', of the truck is provided with a master-gear, $A^2$, which meshes with a pinion, $A^3$, secured to the end of a shaft, $A^4$, mounted in the brackets depending from the truck and carrying a miter-gear, $A^5$, which meshes with a companion, $A^6$, secured to a hollow shaft, $A^7$, vertically mounted in the truck-frame and in a bearing, $A^8$, secured to the beam B.

Within the hollow shaft $A^7$ is arranged a square shaft, D, which is journaled in a cross-head E, mounted so as to slide up and down the beam B, in which movement of the cross-head the square shaft D moves up and down in the hollow shaft $A^7$, although at no time is it entirely disconnected therefrom. It is also understood that the aperture at the upper end of the hollow shaft $A^7$ (through which the square shaft D passes) conforms to the shaft D, so that rotary motion imparted to the hollow shaft by means of the ground-wheel and gearing described is conveyed by the square shaft to the cutting mechanism connected therewith, as hereinafter described.

The means for raising the cross-head E consists of a bar, F, secured to the cross-head and having a bearing on the beam B, and provided at its lower end with a rack, F', in which a pinion, $F^2$, (mounted in a bracket, B', secured to the post,) meshes, the said pinion being operated by a lever, G, having a pawl, G', and pawl-operating lever, $G^2$, which are accessible from the driver's seat H, mounted on the truck. If desired, the cross-head may be stationary, as the tops are cut to length afterward, as will hereinafter appear.

It will readily be seen that when the lever $G^2$ is operated the pawl is raised out of contact with the teeth of the ratchet, and the latter, being securely connected with the lever G, is caused to operate the rack-bar F' when the lever G is oscillated, so that the cross-head, and all of the mechanism mounted thereon, is elevated and depressed for the purpose of presenting the cutting mechanism at a proper elevation to sever the heads of stalks of varied heights.

At the upper end of the square shaft D there is fixed a pinion, D', which meshes with a gear, $D^{2*}$, mounted on the shaft I, journaled in the cross-head and projecting upwardly therefrom, and having mounted thereon a gathering-reel, J, which comprises curved arms, that extend above and slightly beyond the cutting mechanism. Above the pinion D' is mounted a disk, $D^2$, having a wrist-pin, $D^3$, upon which is a connecting-rod, $D^4$, that is secured to the rearward projecting arm K of the vibrating cutter K', the pivot $K^2$ of which projects upwardly from the cross-head E. Beneath the vibrating cutter is a fixed cutting blade or plate, L, substantially U-shaped in its outline, whereby a pocket or recess is formed, into which the corn tops or brushes are drawn by means of the arms of the reel J. Two guide-strips, M, are secured to the fixed plate L, and diverge laterally to form a path, which is gradually contracted, so as to compress and condense the stalks as they are brought up for the action of the cutting mechanism.

As thus far described, it will be seen that, as the machine is drawn along at the side of a row of corn, the cutting mechanism projects over, so as to draw in to it and sever the heads. These severed heads are received upon the delivery-table C, which is mounted upon a beam, C', or other suitable support, projecting above the truck. The upper surface of the delivery-table is inclined, as shown, and through the same there projects a series of teeth, $C^2$, mounted upon a shaft, $C^3$, journaled beneath the table. A companion-shaft, $C^4$, is in this instance provided, having a like series of teeth, and the two shafts are rotated by means of pulleys $C^5$, and a cord, belt, or chain, $C^6$, extending to a pulley, $C^7$, mounted upon the shaft of the ground-wheel A'.

The object, purpose, and function of the teeth and the mechanism for operating the same is to gradually strengthen or dispose of the severed heads in such a manner that they shall lie substantially parallel and regular, and this while they are descending to the lower end of the delivery-table, the descent of the heads being also facilitated by the action of the teeth $C^2$.

N represents an eccentric, mounted on the shaft $A^4$, and connected by a rod, N', to a bell-crank, O, pivoted at O', and having its arm $O^2$ adapted to serve the function of a vibrating cutting-blade, which, in connection with a fixed cutting-blade, $O^3$, constitutes the cutting mechanism which is employed by an attendant riding upon the platform A of the machine, for the purpose of a supplemental trimming of the heads to a uniform length, which is desirable, especially when the head E is not adjustable vertically, which work is accomplished by taking by the hand convenient quantities of the heads from the delivery-table and presenting the stems or the stalk portions thereof to the cutters $O^2$ $O^3$, when said trimmed heads may be deposited upon a shelf, P, secured below the delivery-table or upon the body of the truck, as desired.

Having described the construction and operation of our invention, what we claim is—

1. In a machine of the class described, a cross-head adjustably mounted, as described, a hollow shaft, a depending square shaft provided with a disk and pinion, a connecting-rod, and an oscillating cutter, in combination with a fixed cutter having divergent guiding-arms, and with a rotary gathering-reel arranged above the cutter, substantially as specified.

2. In a machine of the class described, a cross-head vertically adjustable and carrying cutting mechanism, in combination with a delivery-table mounted on the frame and carrying a secondary cutting mechanism operated by an eccentric on a shaft in the system of gearing for operating the primary cutting mechanism mounted on the cross-head, substantially as specified.

3. The combination of the upright B, the vertically-adjustable cross-head E, and carrying the fixed cutter L, the vibrating cutter K', the disk $D^2$, the connecting-rod $D^4$, square shaft D, and with the hollow shaft $A^7$, substantially as specified.

4. The combination of the delivery-table C, having the shelf P, and the secondary cutting mechanism $O^2$ $O^3$ supported thereby, the rod N', and the eccentric N, substantially as specified.

In testimony whereof we affix our signatures in presence of two witnesses.

CHARLES R. HUCKLEBERRY.
FREDERICK W. REESE.

Witnesses:
HENRY VAN SELTAR,
S. I. HEADLEY.